United States Patent [19]

Brey et al.

[11] 4,118,701
[45] Oct. 3, 1978

[54] FM/CW RADAR SYSTEM

[76] Inventors: James C. Fletcher, Administrator of the National Aeronautics and Space Administration, with respect to an invention of Hans Brey, Cookville, Tenn.; Philip E. Geise, Jr., Huntsville, Ala.

[21] Appl. No.: 730,778

[22] Filed: Oct. 8, 1976

[51] Int. Cl.² .............................................. G01S 9/44
[52] U.S. Cl. ...................................... 343/6 R; 343/9
[58] Field of Search ................... 343/6 R (U.S. only), 343/9 (U.S. only), 6 R, 9

[56] References Cited

U.S. PATENT DOCUMENTS

| 2,467,455 | 4/1949 | Aurell | 343/9 |
| 3,483,557 | 12/1969 | Skenderoff et al. | 343/9 |
| 3,526,893 | 9/1970 | Skenderoff et al. | 343/9 X |
| 3,569,967 | 3/1971 | Gendreu et al. | 343/5 CM X |
| 3,732,565 | 2/1973 | Symaniec et al. | 343/9 |

Primary Examiner—Malcolm F. Hubler
Attorney, Agent, or Firm—George J. Porter; John R. Manning; L. D. Wofford, Jr.

[57] ABSTRACT

An FM/CW radar system with improved noise discrimination in which the received signal is multiplied by a sample of the transmitted signal, and the product signal is employed to deflect a laser beam as a function of frequency. The position of the beam is thus indicative of a discrete frequency, and it is detected by the frequency encoded positions of an array of photodiodes. The outputs of the photodiodes are scanned, then threshold detected, and used to obtain the range and velocity of a target.

1 Claim, 3 Drawing Figures

FM/CW RADAR SYSTEM

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

This invention relates to radar systems, and particularly to an improved FM/CW radar system having an improved signal-to-noise discrimination capability.

2. General Description of the Prior Art

Ultimately, the capability of a radar system is dependent upon its ability to resolve or detect useful signals in the presence of electrical noise. There thus exists a point of operation with a given radar system at which either by virtue of the level of transmitter power or operating range (distance to a target), intelligible signals cannot be reliably detected. FM/CW radar systems, while providing a most efficient use of power in obtaining precise range measurements, typically require a phase lock loop to measure frequency differences, and this in turn typically requires a 3 db signal-to-noise ratio and thus power levels generally in excess of that necessary for signal detection and ranging alone. Practically, the detection problem is often that of finding rather narrow band signals in the allotted range, e.g., 10 KHz, where they are often submerged in noise.

It is an object of this invention to provide an improved FM/CW radar system which will operate at lower power levels for a given range.

SUMMARY OF THE INVENTION

In accordance with this invention, a linear FM/CW radar is constructed wherein there is transmitted a signal of constant amplitude and which linearly varies with frequency at a selected rate for some selected range of detection. In the detection process, the received signal, delayed by some discrete time (as a function of range) and shifted in frequency due to doppler (if any), is multiplied with the transmitted signal producing low frequency signals for the up-sweep and down-sweep given by sweep rate, distance to target, and target velocity, relative to the position of the radar. The output of the multiplier providing such signals modulates a frequency responsive light deflector through which is passed a narrow beam of light. A plurality of photosensitive elements are positioned to incrementally pick up the beam over a calibrated deflection range, and thus each photosensitive element may be responsive to a relatively small band of known frequencies which may be practically regarded as a single frequency. The output of each photosensitive element is scanned and fed through a threshold detector which provides an output when there appears a signal greater than uncorrelated noise to provide discrete signals which are processed to extract velocity and range information.

DETAILED DESCRIPTION OF THE DRAWINGS

Figure 1:
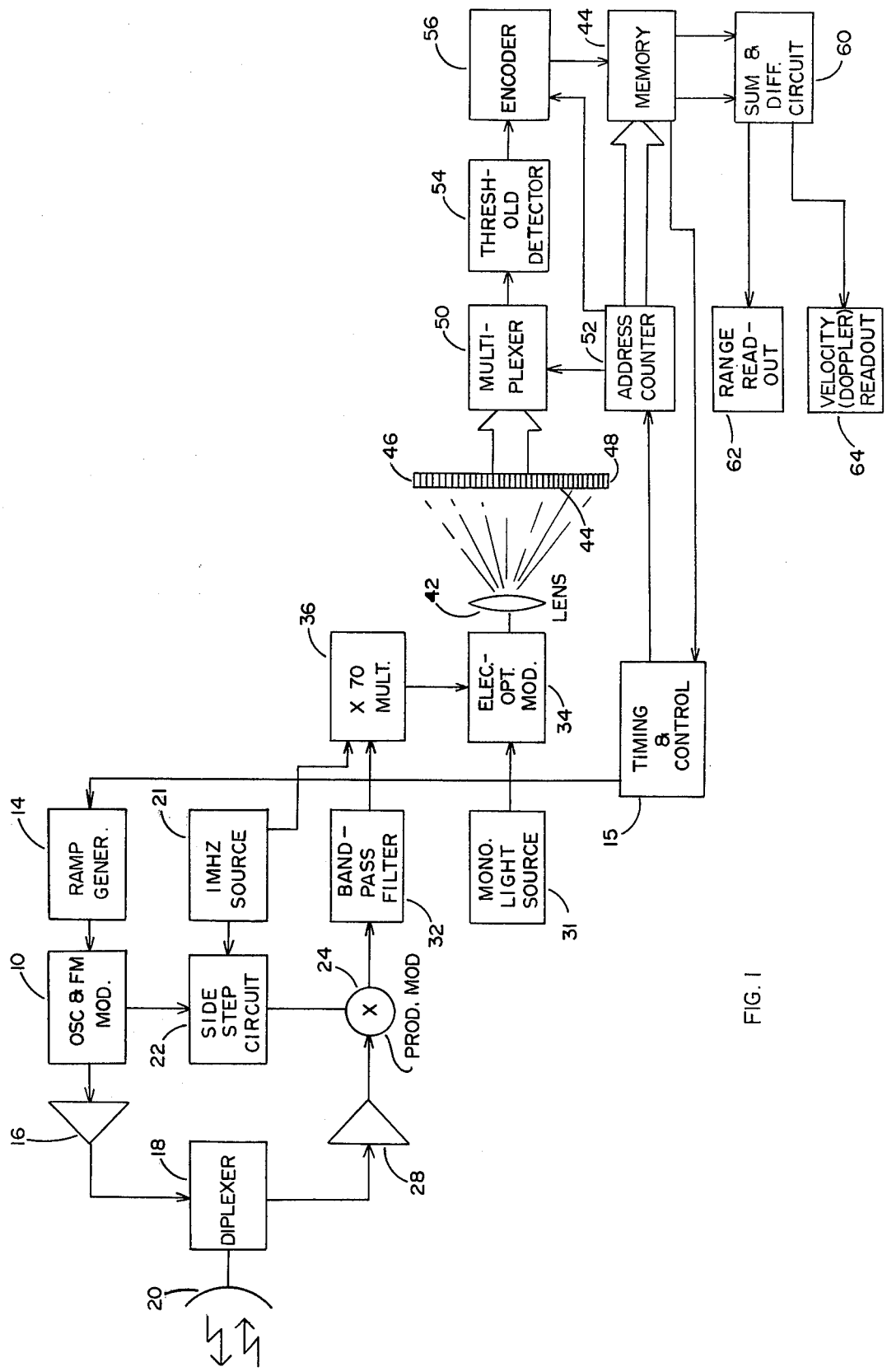
FIG. 1 is a schematic diagram of an embodiment of this invention.

Referring to FIG. 1, FM modulator 10 includes an oscillator which generates an RF radio frequency signal 12 (FIG. 2a) at the center frequency of, for example, 6 GHz, and, responsive to ramp generator 14, the oscillator is modulated in a saw tooth or ramp pattern, as shown, over a selected frequency deviation in the range of ± 15%. Ramp generator 14 is timed by general circuit timing and control circuit 15. In the example shown, the upper or higher frequency would be 6.7125 GHz, and the lower frequency would be 5.2875 GHz. The rate of deviation would be selected as a function of anticipated range and speeds and typically would be 427.5 MHz per second for a range of 100 km. The output of FM modulator 10 is appropriately amplified in amplifier 16 and supplied to diplexer 18 which conventionally provides the amplified signal to antenna 20 which transmits it toward a selected target. A sample of the modulated signal and 1 MHz signal from source 21 are fed to side step circuit 22 which shifts this sample by 1 MHz in order to avoid AM and FM noise and supplies the shifted signal to one input of product modulator 24. A reflection 26 from the target of the transmitted signal (FIG. 2a) is received by antenna 20, fed to diplexer 18, and diplexer 18 conventionally provides the received signal to amplifier 28. Amplifier 28 appropriately amplifies the signal and feeds it to a second input of product modulator 24, which then provides a beat frequency output 30 (FIG. 2b) which, in the example shown, would provide an output of 1 MHz ± 285.7 KHz for a range of 100 Km. The output of product modulator 24 is fed through band pass filter 32 covering this signal range to reduce out-of-band noise signals.

In order to provide an optimum signal input for electro-optical modulator 34, it is desirable to shift the signal frequency and signal deviation up substantially in frequency, and thus frequency multiplier 36 multiplies the signal frequency by a factor of 70 from 1 MHz ± 285.7 KHz to 70 MHz ± 20 MHz, which signal is applied to the modulating input of electro-optical modulator 34. A monochromatic light beam (typically 400 to 1,200 nm) is generated and collimated by a laser light source 30 and applied as a light input to optical modulator 34. Optical modulator 34 is a type which, responsive to an electrical signal input, produces a deflection of the input light beam as a function of applied frequency. One example of such a deflector is Zenith's D-70D Acousto-Optic Light Deflector. Since this light deflector has a relatively small total scan angle for a given change in signal, the scan angle is magnified as shown by means of lens assembly 42, representative of telescope optics which effectively magnify the scan angular change per unit of frequency. As shown, the modulated light beam is deflected across 400 to 1,000 or more diodes (depending upon the resolution of the optical system) of photodiode array 44 which are linearly arranged with, for example, the top photodiode 46 responsive to the frequency of the highest one thousandth increment of frequency (for a 1,000 unit array), and the bottom photodiode 48 being responsive to the lowest one thousandth increment of frequency. In terms of the intelligence signal range of product modulator 24 of 571.4 KHz (1 MHz ± 285.7 KHz), each photodiode covers a base frequency range of only 571.4 Hz which corresponds to 200 m. An output of each photodiode is connected to an input terminal of multiplexer 50 which, under the control of address counter 52, scans each of the photodiodes and provides an identified output through threshold detector 54 to encoder 56 which, when a discrete output appears, is encoded into a digital number representative of the frequency of the band of frequencies to which a diode is position responsive. The operation is further synchronized by timing and control circuit 15 which times the operation of address counter 52, memory 44, and ramp generator 14.

Encoder 56 is controlled by address counter 52 to thus synchronize the encoding process with the particular diode being scanned. Threshold detector 54 is set to pass signals just above noise threshold sufficiently to insure that an actual signal exists. Also under the control of address counter 52, the digital outputs of encoder 56, designating the upper and lower frequencies present, are temporarily stored in discrete addresses in memory 44 and then read out by conventional means to sum and difference circuit 60.

Figure 2A:
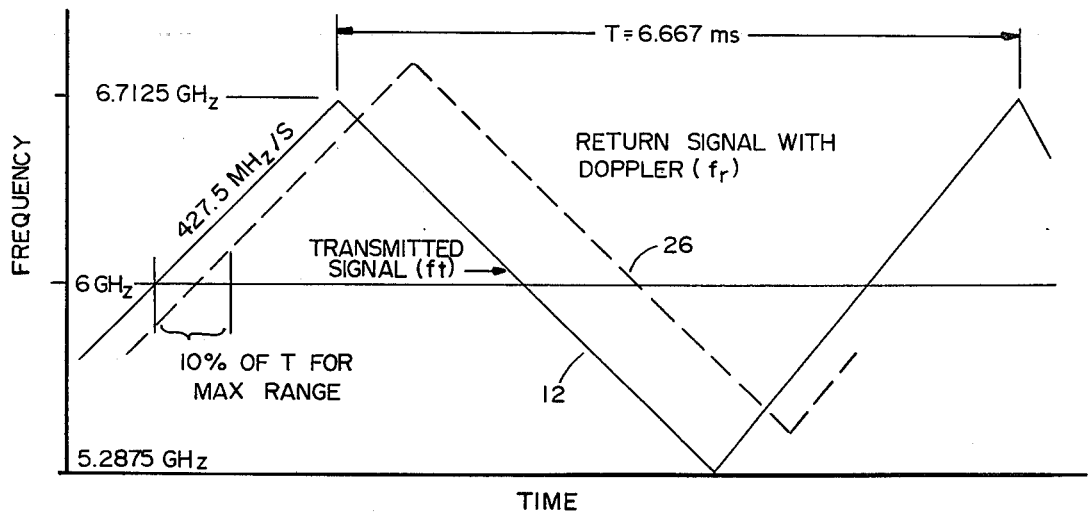
FIGS. 2a and 2b contain two related curves of signals pertinent to the operation of the system shown in FIG. 1.
Figure 2B:
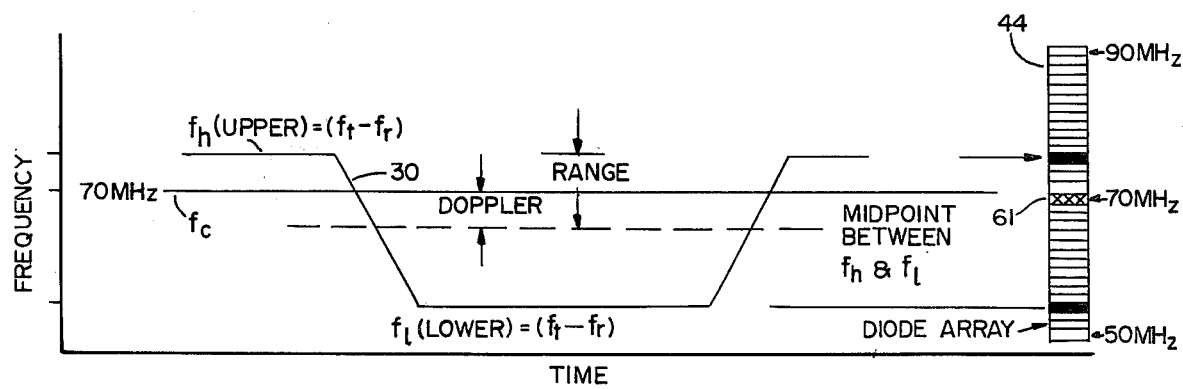

The relationship between the pertinent frequencies and outputs of photodiode array 44 is illustrated in FIGS. 2a and 2b, FIG. 2a showing the transmitted and received signals with doppler present, and FIG. 2b illustrating the difference between the transmitted and received signals in terms of a 70 MHz center frequency and graphically showing computations for target range and doppler (velocity). Thus, sum and difference circuit 60 provides a first signal proportional to the absolute value of the difference between the transmitted and received frequencies $f_t - f_r$, this being equal to $\frac{1}{2}(f_h - f_l)$, and, as shown, this is proportional to and derived from one-half of the peak-to-peak deflection of $f_t - f_r$ corresponding to the appropriate diodes. Actual calculation of range is $k_1 1\frac{1}{2}(f_h - f_l)$, where $k_1$ is a known constant.

Velocity is determined by sum and difference circuit 60 by computing a second signal equal to $\frac{1}{2}(f_h - f_l) - f_c$. The correspondence between $f_c$, the center or offset frequency, and photodiode 61 located in the center of the array is periodically established in a self test mode by routing 1 MHz signal from source 21, which is used in the side step circuit, directly and without any other received signals, to multiplier 36. Actual velocity in the target is determined by $k_2 \cdot \frac{1}{2}(f_h + f_l) - f_c$, where $k_2$ is a known constant. As will be observed from FIG. 2b, $f_h$ is equal to $f_t - f_r + f_c$, and $f_l$ is equal to $f_c - (f_t - f_r)$.

Misalignments, as they may occur, are compensated for in sum and difference circuit 60. Similarly, the frequencies corresponding to the maximum deviation, that is, 1.2857 MHz and 0.7143 MHz, are routed through multiplier 36 and optical system 34 to affix the maximum deviation for calibration purposes.

The system is adaptive because the ramp frequency is varied in accordance with the measured range, thus increasing the range resolution measured in meters as the distance to the target decreases.

CW operation of the system generally enables a most efficient use of power, and frequency modulation assists in providing a precise range measurement. By employing the optical detection system described in which a Fourier transform in real time is performed, coupled with threshold detection, there should be achievable a reduction in band width of signal processing from 10,000 Hz to 200 Hz, or perhaps less, representative of an effective improvement in the signal-to-noise ratio over a conventional FM/CW system of 23 db, or greater. This improvement may thus be utilized to decrease transmitter power, and thus enable the construction of a lighter weight radar system of the same capability or enable the construction of a system with greater range for the same transmitter power.

Having thus disclosed our invention, what is claimed is:

1. In an FM/CW radar system including means for generating and transmitting a radio frequency signal which is varied between an upper and lower frequency at a selected rate, the improvement comprising:

reference signal means for generating a radio frequency reference signal;

side step circuit means responsive to said transmitted signal and a signal from said reference signal means for providing a signal sample, a signal differing in frequency from said transmitted signal by the quantity of said frequency of said reference signal means;

receiving means for receiving a reflection of the transmitted signal from a target and multiplying the received signal by said sample signal to provide an intelligence signal;

frequency multiplication means responsive to the output of said receiving means for multiplying by a selected multiple the frequency of said intelligence signal, whereby the difference between upper and lower frequencies present are increased, and being additionally responsive to said radio frequency reference signal for multiplying it by the same multiple;

light source means providing a beam of monochromatic light;

light deflection means responsive to said beam of monochromatic light and the output of said multiplication means for providing, as an output, a light beam which varies in angle of departure as a function of the signal frequency of output of said multiplication means responsive to said intelligence signal and providing a reference angular output responsive to said reference signal;

lens means for magnifying the angle of the angularly modulated light output of said light deflection means; and light angle detection means comprising a plurality of side-by-side frequency indicative photodetectors, each positioned to sense a discrete angular position of the light output from said lens means, and thereby the output of each is indicative of an input frequency to said light deflection means, and whereby highest and lowest frequency signals are indicated by the maximum spaced photodetectors receiving signals, and said reference angular output being identified by the photodetector receiving an output responsive to said reference signal.

* * * * *